(12) United States Patent
Bangor et al.

(10) Patent No.: US 7,590,229 B2
(45) Date of Patent: Sep. 15, 2009

(54) SYSTEM FOR PROMPTING THE CALLER BEFORE AND AFTER VOICE-OVER-INTERNET-PROTOCOL CALL CONNECTION

(75) Inventors: Aaron W. Bangor, Austin, TX (US); Douglas F. Reynolds, Austin, TX (US); Jeffrey L. Brandt, Cedar Park, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 102 days.

(21) Appl. No.: 11/318,729

(22) Filed: Dec. 27, 2005

(65) Prior Publication Data
US 2007/0147597 A1 Jun. 28, 2007

(51) Int. Cl.
*H04M 1/56* (2006.01)

(52) U.S. Cl. .............................. 379/142.06; 379/207.15

(58) Field of Classification Search ................ 379/93.3, 379/88.18, 88.23, 201.01, 201.02, 201.07, 379/201.08, 201.1, 142.01, 142.1, 142.11, 379/142.06, 210.01, 214.01, 88.17, 88.12, 379/207.15
See application file for complete search history.

(56) References Cited

U.S. PATENT DOCUMENTS

| | | | |
|---|---|---|---|
| 4,996,704 A | 2/1991 | Brunson | |
| 5,539,809 A * | 7/1996 | Mayer et al. | 379/210.02 |
| 5,566,236 A * | 10/1996 | MeLampy et al. | 379/210.01 |
| 6,047,053 A * | 4/2000 | Miner et al. | 379/201.01 |
| 6,266,400 B1 | 7/2001 | Castagna | |
| 6,324,265 B1 * | 11/2001 | Christie et al. | 379/88.23 |
| 6,459,776 B1 | 10/2002 | Aktas et al. | |
| 6,535,596 B1 * | 3/2003 | Frey et al. | 379/201.01 |
| 6,553,222 B1 | 4/2003 | Weiss | |
| 6,590,970 B1 * | 7/2003 | Cai et al. | 379/221.11 |
| 6,600,817 B1 | 7/2003 | Shaffer et al. | |
| 6,658,100 B1 | 12/2003 | Lund | |
| 6,728,354 B1 | 4/2004 | Fleck et al. | |
| 6,785,244 B2 * | 8/2004 | Roy | 370/252 |
| 6,792,092 B1 | 9/2004 | Michalewicz | |
| 6,829,332 B2 * | 12/2004 | Farris et al. | 379/88.02 |
| 6,842,512 B2 * | 1/2005 | Pedersen | 379/142.01 |
| 6,853,714 B2 | 2/2005 | Liljestrand et al. | |
| 6,891,942 B1 | 5/2005 | Porter et al. | |
| 6,928,152 B2 | 8/2005 | Takeda et al. | |
| 6,961,410 B1 | 11/2005 | Castagna | |
| 7,039,040 B1 | 5/2006 | Burg | |
| 7,065,070 B1 | 6/2006 | Chang | |

(Continued)

FOREIGN PATENT DOCUMENTS

EP 0 420 527 A2 4/1991

(Continued)

*Primary Examiner*—Olisa Anwah
(74) *Attorney, Agent, or Firm*—Brinks Hofer Gilson & Lione (57) ABSTRACT

A method for interacting with a calling party during a call session in a VoIP system includes determining rules to apply to the call session before, during, and after the call based on parameters associated with the calling party or a called party, where the called party and the calling party participate in the call session; storing the rules in a database such as an address book; applying the determined rules to the calling party's incoming call; outputting a prompt to the calling party; and receiving the calling party's incoming call.

22 Claims, 4 Drawing Sheets

U.S. PATENT DOCUMENTS

| | | |
|---|---|---|
| 7,187,761 B2 * | 3/2007 | Bookstaff .............. 379/201.01 |
| 7,245,924 B2 * | 7/2007 | Katagishi et al. ......... 455/456.1 |
| 7,400,711 B1 * | 7/2008 | Ford et al. .................... 379/70 |
| 2002/0126814 A1 * | 9/2002 | Awada et al. .......... 379/142.01 |
| 2003/0112944 A1 * | 6/2003 | Brown et al. ........... 379/201.01 |
| 2003/0156700 A1 | 8/2003 | Brown et al. |
| 2003/0231749 A1 | 12/2003 | Ansley et al. |
| 2004/0114747 A1 | 6/2004 | Trandal et al. |
| 2004/0125924 A1 | 7/2004 | McMullin et al. |
| 2005/0041787 A1 | 2/2005 | Casey et al. |
| 2005/0055202 A1 | 3/2005 | Kunito et al. |
| 2005/0195954 A1 | 9/2005 | Klein et al. |
| 2005/0261034 A1 | 11/2005 | Punaganti et al. |
| 2007/0047533 A1 | 3/2007 | Criddle et al. |
| 2007/0133785 A1 * | 6/2007 | Cotignola et al. ...... 379/373.01 |
| 2007/0147349 A1 | 6/2007 | Bangor et al. |
| 2007/0147350 A1 | 6/2007 | Bangor et al. |

FOREIGN PATENT DOCUMENTS

| | | |
|---|---|---|
| EP | 0 948 178 A2 | 10/1999 |

\* cited by examiner

SYSTEM FOR PROMPTING THE CALLER BEFORE AND AFTER VOICE-OVER-INTERNET-PROTOCOL CALL CONNECTION

BACKGROUND OF THE DISCLOSURE

1. Technical Field

The invention relates to voice-over-internet protocol (VoIP) telephony call sessions. In particular, the invention relates to call session configuration in a VoIP telephony system based on parameters and settings stored in a database. The application is also related to U.S. patent application filed on Dec. 27, 2005, entitled "System for Customized Messaging Presentation Based on Called-Party Voice-Over-Internet-Protocol Settings," and having Ser. No. 11/318,673, and U.S. Patent Application filed on Dec. 27, 2005, entitled "System for Predefined Voice-Over-Internet-Protocol Call Parameters" and having Ser. No. 11/318,696, which are incorporated by reference herein in their entirety.

2. Related Art

Voice-over-IP (VoIP) telephony systems provide traditional phone calling using packet technology like the Internet. Because this technology is based on software and open standards, much more flexibility is achievable compared to conventional telephone technology. VoIP makes easy some things that are difficult with traditional phone networks: incoming phone calls can be automatically routed to a VoIP phone, irrespective of the connection to the network. A user may carry a VoIP phone on a trip, and connect anywhere to the Internet to receive incoming calls. Call center agents using VoIP phones can work from anywhere with a sufficiently fast Internet connection. In addition, VoIP phones can integrate with other services available over the Internet, including video conversation, message or data file exchange in parallel with the conversation, audio conferencing, managing address books and passing information about whether others (e.g. friends or colleagues) are available online to interested parties.

Most voice mail systems currently present the same experience to callers, regardless of who they are or the circumstances of the called party. For some messaging systems customization is achieved by playing different greetings to callers based on the time of day, the day of week, and/or busy/not busy line status. Other options can be manually turned on or off, such as by using an extended absence greeting or enabling special features like transfer-to-operator or paging services.

Voice-over-IP (VoIP) telephony systems provide traditional phone calling using packet technology like the Internet. Because this technology is based on software and open standards, much more flexibility is achievable. Voice over IP (VoIP) technology differs from older telephony technology in that it uses a data protocol over data networks. As such, there is greater flexibility and control over the calling task than the older circuit-switched technology. This facilitates interaction with other user interaction points. One of the functions that call processing can interact with is an address book. An address book stores names, phone numbers, addresses, etc. of a user's contacts. This integration is currently used to play different ring tones, offer multiple options for reply/redial, speed dialing, and alternate call forwarding options.

For example, a user can click a phone number on a web site and their IP phone calls that number. But, in this example—or the more traditional scenario of dialing a phone number on the phone's keypad—once the phone number has been entered, the call is placed. It would be useful if the caller could be prompted before the call completes to inform them of special situations or to ask them about how they would like to treat the call.

SUMMARY

In one embodiment; a method for configuring a VoIP system for pre-defined call parameters includes storing call setting parameters associated with a VoIP call session in an address book, where the parameters are associated with called party identification records stored in the same address book characterizing the called parties; transmitting, to a called party, a call from a calling party, where a called party identification record associated with the calling party is stored in the address book; determining the call setting parameter associated with the called party identification record; initiating a call session based on the call from the calling party; and adjusting one or more call session settings based on the determined call setting parameter.

In another embodiment, a method for customized messaging presentation based on called-party voice-over IP (VoIP) settings in a VoIP telephony system includes determining settings for a calling party based on parameters associated with the calling party, where the parameters are stored in an address book accessible to a called party; storing the settings for the calling party; identifying the calling party calling the called party when the calling party initiates a call to the called party; applying the determined settings for the calling party to configure the call session; and responding to the calling party based on the applied settings.

In a third embodiment, a method for interacting with a calling party during a call session in a VoIP system includes determining a first set of rules to apply to the call session based on parameters associated with the calling party or a called party, where the called party and the calling party participate in the call session; storing the rules in a database such as an address book; applying the determined rules to the calling party's incoming call; outputting a prompt to the calling party; and receiving the calling party's incoming call.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

The elements in the figures interoperate as explained in more detail below. Before setting forth the detail explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the display systems may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the architecture will be described, methods, systems, and articles of manufacture consistent with the architecture may include additional or different components. For example, a processor may be implemented as a microprocessor, microcontroller, application specific integrated circuit (ASIC), discrete logic, or a combination of other type of circuits or logic. Similarly, memories, may be DRAM, SRAM, Flash, or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors.

Figure 1:
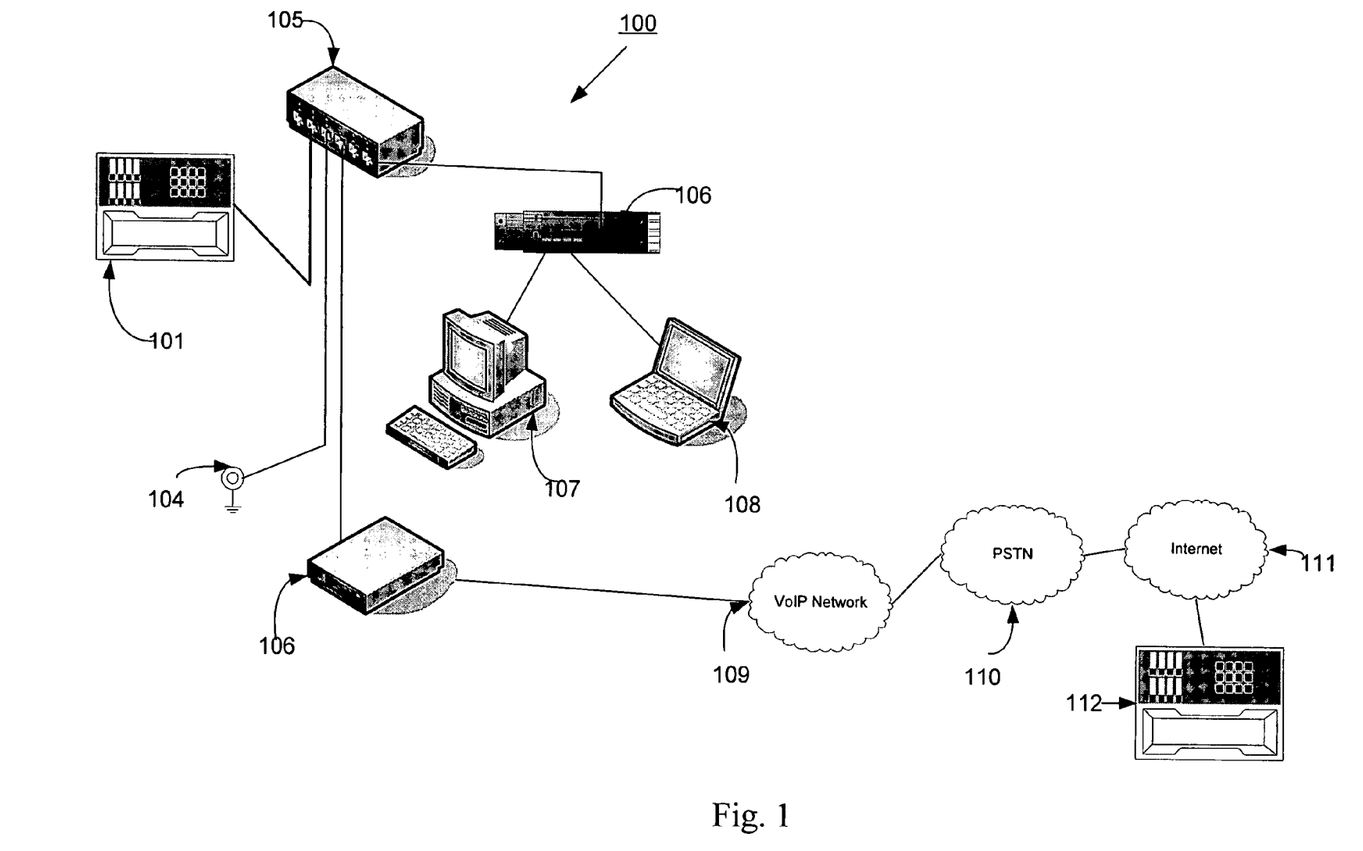
FIG. 1 illustrates a voice-over-IP telephony system.

FIG. 1 illustrates a VoIP telephony system 100. The VoIP system 100 may include a telephone 101 connected to a local area network (LAN) 105. The LAN 105 may connect multiple computers, such as desktop PC's 107 and laptop PC's 108, through a router such as a broadband router 106. The LAN 105 may also connect to a source of power 104. Any of the computers 107 and 108 may serve as the source or destination of VoIP data traffic. The LAN 105 may connect to a device for transmitting data through a network, such as a broadband modem 106. Examples of broadband modems include dial-up modems, cable modems, digital subscriber link (DSL) modems, ISDN modems, and other data modems. The modem 106 may connect to a network such as a VoIP network 109. The VoIP network 109 may be interfaced to the Public Switched Telephone Network (PSTN) 110, which may be interfaced with the Internet 111, but the VoIP network 109 may also connect to other LAN's, or wide area networks (WANs) (not shown) or any network. A user may then call or receive with both IP-IP call sessions or mixed IP-circuit-switched calls. A second telephone 110 may be connected to the Internet 111, and the telephone 110 may serve as a source or destination of call session data to connect to the first telephone 101. The VoIP system 100 may also include storage devices, servers, wireless devices, portable electronic devices, set-top boxes, media devices, cellular phones, and entertainment devices (not shown), which may all provide data to or receive data from the LAN 105 and transmit across the Internet 109.

Figure 2:
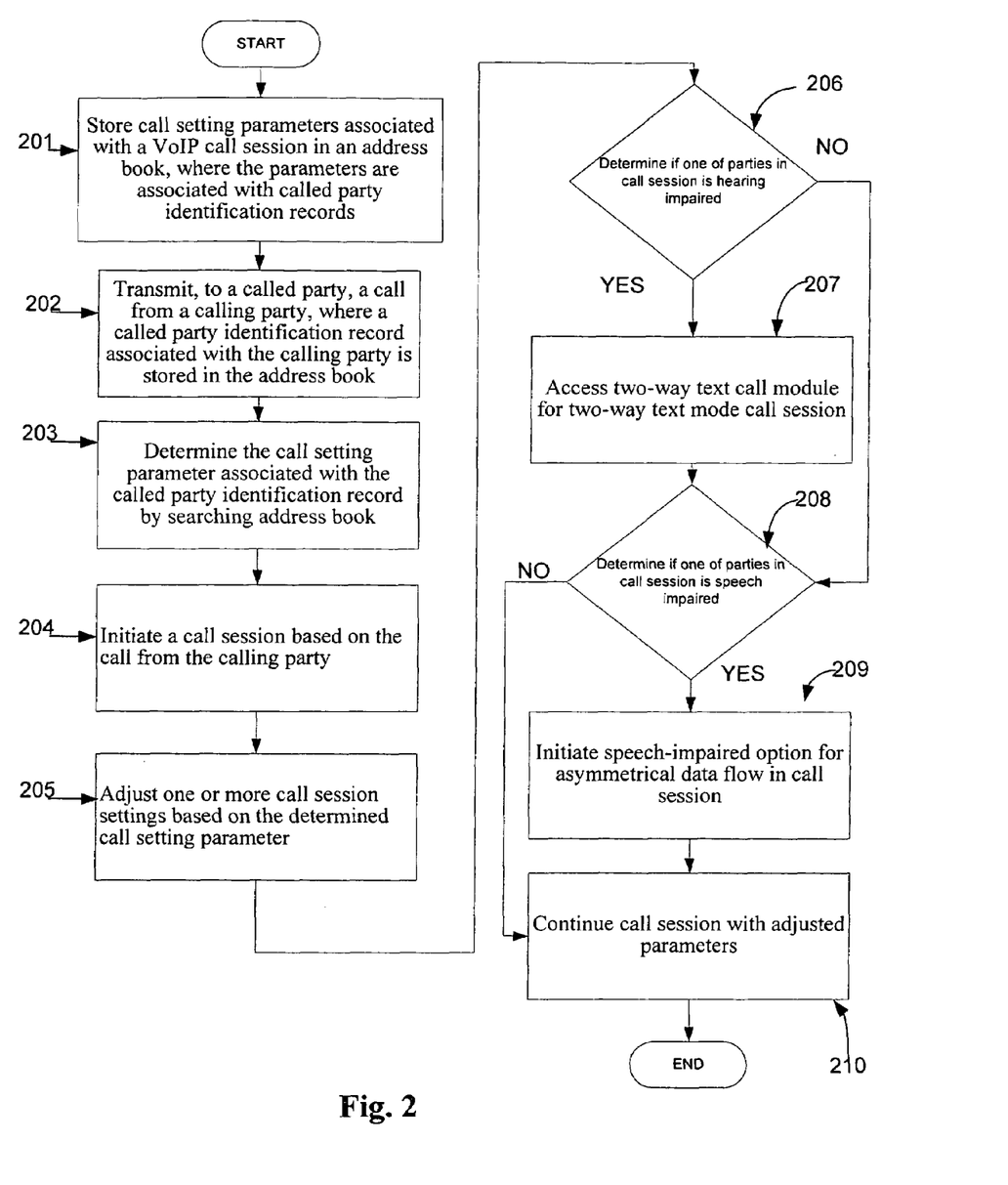
FIG. 2 illustrates an example method for configuring a voice-over-IP (VoIP) system for pre-defined call parameters.

FIG. 2 illustrates an example method for configuring a voice-over-IP (VoIP) system for pre-defined call parameters. Any of the steps of FIG. 2 can be performed by any suitable component of the system 100 of FIG. 1. In one embodiment, the VoIP system 100 stores, at step 201, call setting parameters associated with a VoIP call session in a database, where the parameters are associated with called party identification records stored in the same database characterizing called parties. The call setting parameters may be stored in a memory resident to the LAN 105, a desktop PC 107, a laptop 108, or memory interfaced to any of the devices connected to the system 100. The database may be an address book maintained by a user of the system 100, where the address book contains fields of contact information associated with called or calling parties. The address book may contain information such as a contact name, a telephone number, a geographic location, call treatment templates, a business association, family information, environmental settings associated with the called party's location, special accommodations for the called party related to disabilities or age requirements, call session security levels required, and recording options for the call session.

The system 100 transmits, to a called party, a call from a calling party, where a called party identification record associated with the calling party is stored in the database, at step 202. The system 100 then determines, at step 203, the call setting parameter associated with the called party identification record. The VoIP system 100 may initiate a call session based on the call from the calling party, at step 204 and adjust, at step 205, one or more call session settings based on the determined call setting parameter. For example, if a user knows that a phone number in their address book is on a noisy manufacturing floor, a setting could be enabled that automatically changes the sound volume level of their voice by 5 dB. Or, the same sound level boost could be associated with all phone numbers associated with the user's elderly parent who is hard-of-hearing. In these situations, another setting also could be enabled to turn on a higher quality-of-service codec that improves the speech intelligibility of the call.

A variation of this idea is to alter the nature of the call. When an IP phone user makes or receives a call from a contact who has a setting enabled that designates them as deaf, the call ia set up in two-way text-mode. In one embodiment, the system 100 stores calling party call setting parameters associated with a VoIP call session in the database, where the second parameters are associated with the calling party identification records stored in the same database characterizing the called party. The system 100 then determines the calling party call setting parameter associated with the calling party identification record; and adjusts one or more call session settings based on the determined calling party call setting parameter. The system 100 accesses a two-way text call module, such as a TeleTYpe (TTY) module, in communication with the VoIP system if the calling party identification record or the called party identification record indicates, at step 206, that a two-way text call is required for communication and initiate, at step 207, a two-way text call session between the calling party and the called party. A TDD module or instant messaging module may also be used.

In some embodiments, the same setting also has a speech impaired option that sets up the call from the user to the contact as voice audio, but from the contact to the user as text. If the system 100 determines that a party is speech impaired, at step 208, the system 100 initiates a speech-impaired call session option, at step 209 where data transmitted from a speech impaired party is transmitted to a non-speech impaired party as text data only and data transmitted from a non-speech impaired party is transmitted to a speech impaired party as audio data only, where a speech impaired party is designated based on the calling party identification record or the called party identification record. One-way and two-way text call sessions may be initiated for both incoming and outgoing calls. In addition, one embodiment may include using a text-to-speech (TTS) module from a deaf or speech-impaired caller and a speech-to-text module from the hearing party to the deaf/speech-impaired party.

Other settings could enable call encryption or begin logging/recording of the call. In some embodiments, the system 100 determines that a changed encryption level is required based on an identification record. The system 100 then changes the encryption level of the call session accordingly. In one embodiment, the system 100 determines that a recording of the call session is required or forbidden based on the call setting parameter associated with the called party contact information and records the call session, if recording is permitted or required, where the recording comprises storing the data associated with the call session in a storage medium. Alternatively, the system 100 may prevent recording of the call session if recording is forbidden. The system may continue, 210, the call session with the adjusted parameters.

The above are examples of how this idea is functionally implemented. The basic premise, however, is that the user is able to control settings associated with contacts in an address book. When VoIP communications are set up, these settings are checked and parameters of the call are configured based on these individualized settings, not global parameters for the user or the network.

Two of the most common features to integrate with calling are find me/follow me and other advanced call forwarding options, as well as an address book of contacts. VoIP systems can have multiple selectable call forwarding options, including settings that try the subscriber at multiple phone numbers—ringing sequentially or simultaneously. Combined with an address book, a single template of call forwarding options can treat callers differently based on who is calling.

Figure 3:
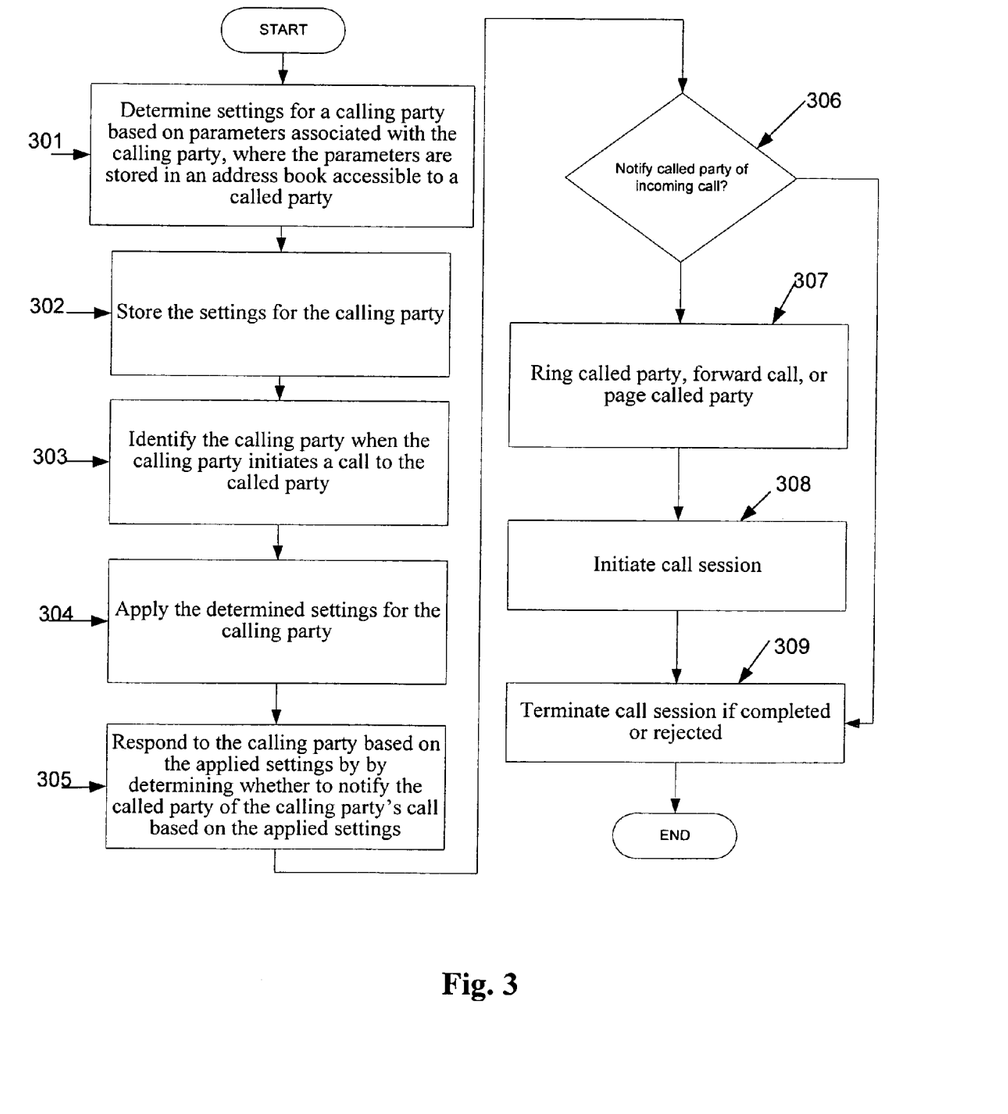
FIG. 3 illustrates an example method for a customized messaging presentation based on called-party VoIP settings in a VoIP telephony system.

FIG. 3 illustrates an example method for a customized messaging presentation based on called-party VoIP settings in a VoIP telephony system. Any of the steps of FIG. 2 can be performed by any suitable component of the system 100 of FIG. 1. In one embodiment, the system 100 determines, at step 301, call session settings for a messaging system based on parameters associated with the calling party from a database, where the parameters are stored in a database accessible to a called party. The database may comprise an address book maintained by the called party, where the address book comprises records associating a list of calling parties with a list of settings to apply to the calling parties. The system 100 searches the database The system 100 stores, at step 302, the call session settings for the calling party. The settings may be stored in memory resident to a device in communication with the VoIP system 100, such as a desktop computer 107, a laptop 108, router 106, or in memory interfaced to the system 100. The system 100 then identifies, at step 303, the calling party calling the called party when the calling party initiates a call to the called party. The system 100 applies, at step 304 the determined call session settings for the calling party, and responds, at step 305 to the calling party based on the applied call session settings. The system 100 may respond to the calling party by determining whether to notify the called party of the calling party's call based on the applied call session settings.

The call session settings that a user may select include transfer or paging options to the calling party within the messaging system, different outgoing messages, different message types (such as spoken, text, TTY or other options), a message type delivered to the calling party, a message duration allotted to the calling party, or allowable calling restrictions based on the time, date, or month of the call. The parameters that a user may associate the call session settings with include the name of the calling party, phone number of the calling party, the title of the calling party, location of the calling party including area codes, location of the called party, call treatment templates, or a business association of the calling party. Other settings and parameters are possible, depending on the address book and needs of the user.

In this manner, different calls from different callers are handled differently, depending on the settings specified by the subscriber. For example, a call from a subscriber's supervisor may be sent directly to the subscriber's cell phone and then a home phone number, while a family member's call goes directly to the home phone number, a business acquaintance goes to the office phone and then the cell phone, and a persistent telemarketer goes directly to voice mail. Such rules can be associated with individual contacts in an address book or with groups of contacts.

The VoIP system 100 may determine whether to notify, at step 306, a called party of the calling party's call if the calling party is an allowed calling party based on the applied settings. If the calling party is an allowed calling party, the system 100 may indicate the presence of the call by the ring type associated with the calling party, transfer the call to a message center, or page the called party, or forward the call, at step 307, and then initiate a call session at step 308. If the calling party is not an allowed calling party, such as when the calling party name, location, or business association is controlled or screened for incoming calls by the called party, the system 100 may reject the call session, and terminate the call session, at step 309. Alternatively, the system 100 may provide a message to the calling party when the call is rejected.

Voice over IP technology enables a subscriber to define different call routing experiences for their callers using a menu of options, customized to a particular caller or group of callers. These same options used for call routing can also be used to shape the caller's experience when they are sent to the messaging (i.e., voice mail) system. The Voice over IP system identifies the caller (e.g., by the phone number, IP address, etc, using a caller identification module for example) and, based on defined settings for that caller or the group the caller has been associated with, passes that information to the messaging system. Based on the identity, the messaging system presents a different experience to the caller. For example, if the caller is the subscriber's supervisor, the caller will be allowed to record a message longer than normal, be offered an option to page the subscriber, have the option to press a key to be transferred to someone else, and/or hear a special greeting. On the other hand, if a telemarketer calls, they will be played a special greeting, not be offered the paging or transfer to operator options, and have the maximum message length drastically reduced.

In addition to the messaging system being customized based on who is calling, in other embodiments it is customized based on current call processing settings. For example, if a call forwarding template has been set up for use during vacations (whether activated manually or automatically based on a calendar or other means), the extended absence greeting can be automatically turned on. Also, the maximum message length is shortened to conserve storage space while the subscriber will not be checking and deleting messages. Other services like paging are turned off so as not to disturb the subscriber's vacation, but other services like a transfer-to-operator option could be turned on to act as coverage during an extended absence.

The method illustrated in FIG. 3 improves on existing technology by providing a subscriber more control over the experience of their callers by integrating features of Voice over IP (VoIP) and unified messaging systems, as well as making this control more user-friendly because the settings for two systems are combined. It does so in two major ways. First, it allows the caller's experience to be customized based on caller identity (e.g., supervisor, telemarketer, etc.). Secondly, it can customize the caller's experience based on the circumstances of the subscriber (e.g., on vacation). Such integration will improve the usefulness and usability of both services.

Figure 4:
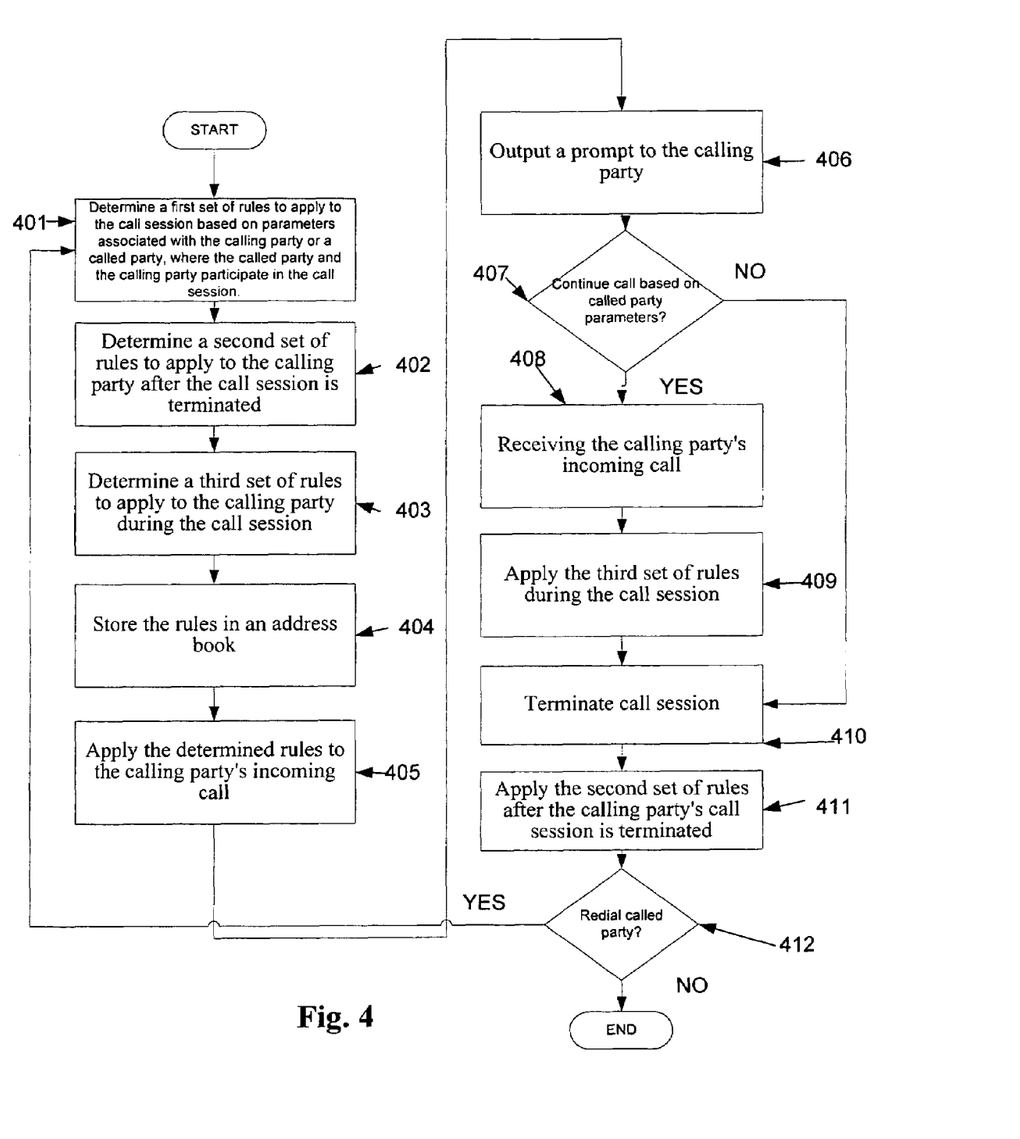
FIG. 4 illustrates an example method for interacting with a calling party during a call session in a VoIP system.

FIG. 4 illustrates an example method for interacting with a calling party during a call session in a VoIP system. During the prompt general rules can be applied. In one embodiment, the VoIP system 100 determines, at step 401, a first set of rules to apply to the call session based on parameters associated with the calling party or a called party, where the called party and the calling party participate in the call session. The system 100 also may determine a second set of rules to apply to the calling party after the call session is terminated, at step 402. In addition, the system 100 may determine a third set of rules to apply to the calling party during the call session, at step 403. The system 100 stores, at step 404, the first, second, and third set of rules in a database. The database may comprise an address book maintained by the called party, where the address book comprises records associating a list of calling parties with a list of settings to apply to the calling parties. The system 100 applies, at step 405, the determined rules to the calling party's incoming call, and outputs a prompt to the calling party, at step 406. The system 100 may determine whether to continue the call session based on the called party parameters, at step 407. If the system 100 determines the call session should be continued, the system 100 then receives the calling party's incoming call, at step 408. The system 100 applies the third set of rules during the call session, at step 409, and terminates the call session when completed, at step 410. If the system 100 determines that the call session should not be continued, the system 100 may terminate, at step 410, the call session. After the call session is terminated, the system 100 applies the second set of rules, at step 411. For example, if a destination's time is after midnight, the system informs the caller of this and asks them if they are sure they want to continue with the call. But rules could also be individualized to the specific called party. If the user has the called party's contact information saved in an address book, the system checks the stored time parameters or other settings for that contact. In the above scenario, the warning time could be moved up to 9 pm because that person goes to bed early. This would be especially useful when calling different time zones as the time parameters could be adjusted for local time.

Special messages may be solely informative, also. For example, if a businessperson is calling a client, information about the area they are in (e.g., weather retrieved from the Internet), the company they work for (e.g., dollar value of current contracts from an intranet database), or specific to that person (e.g., spouse's name from their address book) is presented to the user.

During the prompt, selections can be made by the user from myriad options. Default selections for these options could be set at the system level, by the user for all of their calls, and/or individualized for different contacts in their address book. These options can affect what the called party hears (e.g., ring tone) or sees (e.g., caller ID information), what the user hears (e.g., ring-back tone) or sees (e.g., timer). A service provider may charge to use some of these options.

A prompt may also be presented after the call disconnects. Options may be presented that ask the user what they would like to do about the call that has just finished. For example, a billing code for the call could be assigned or changed, information may be presented (e.g., how long the call lasted), the user may listen to voice mail left during the call, or an option to redial may be presented, for example, at step 412, which may be useful for calls that frequently disconnect. Other options are possible.

The prompt discussed above could be presented visually on a screenphone or computing device, or other visual display, and/or audibly via the phone loudspeaker being dialed, or via other speaker elements. Via a visual presentation, the mechanism used to display the before-call prompt could remain, in whole or in part, after call completion.

The sequence diagrams may be encoded in a signal bearing medium, a computer readable medium such as a memory, programmed within a device such as one or more integrated circuits, or processed by a controller or a computer. If the methods are performed by software, the software may reside in a memory resident to or interfaced to the LAN 105, a communication interface, or any other type of non-volatile or volatile memory interfaced or resident to the VoIP system 100. The memory may include an ordered listing of executable instructions for implementing logical functions. A logical function may be implemented through digital circuitry, through source code, through analog circuitry, or through an analog source such as through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any unit that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for interacting with a calling party during a call session in a voice-over-Internet-protocol (VoIP) system comprising:

determining a first set of rules from a database to apply to the call session based on parameters associated with the calling party or a called party, where the called party and the calling party participate in the call session over the VoIP system;

storing the rules in the database;

applying the determined rules to a calling party's incoming VoIP call received over the VoIP system;

generating a prompt to the calling party, the prompt being based on the first set of rules and the parameters associated with the calling party or a called party, the prompt defining a plurality of call processing features or options;

communicating the prompt to the calling party;

receiving a response to the prompt from the calling party;

receiving the calling party's incoming call over the VoIP system;

processing the calling party's incoming call according to the response to the prompt;

determining a second set of rules from the database to apply to the calling party after the call session is terminated based on parameters associated with the calling party or a called party, the second set of rules being associated with the terminated call;

storing the second set of rules in the database; and applying the second set of rules after the calling party's call session is terminated, including presenting to the calling party information related to the call session duration, billing information related to the call session, or messages recorded during the call session.

2. The method of claim 1 where determining the first set of rules comprises determining the parameters comprising a local time where the calling party is located, a local time where the called party is located, the location of the calling party, the location of the called party, a business association related to the calling party or the called party, and personal information related to the calling party or the called party.

3. The method of claim 2 where determining the first set of rules comprises determining a third set of rules to apply to the calling party during the call session; and applying the third set of rules to the calling party during the call session.

4. The method of claim 2 where applying the determined rules comprises:

providing a message to the calling party based on the time of day where the calling party is located or the time of day where the called party is located; and prompting the calling party to continue the call session based on the local time of the calling party or the local time of the called party.

5. The method of claim 2 where applying the determined rules comprises:

providing a message to the calling party, where the message is related to local conditions of the called party or information associated with the called party; and prompting the calling party to decide a course of action based on the message.

6. The method of claim 5 where the local conditions of the called party include weather information, traffic information, or event information associated with the called party's location.

7. The method of claim 3 where applying the third set of rules comprises:

applying a general rule to all calling party calls, if the called party sets the general rule;

providing a called party specific alert to the called party, where the called party specific alert is contained in the third set of rules; and providing a calling party specific alert to the calling party, where the calling party specific alert is contained in the third set of rules.

8. The method of claim 7 where providing the called party specific alert comprises providing a specific calling party ring tone or a visual and/or audible caller identification of the calling party.

9. The method of claim 8 where providing the calling party specific alert comprises providing a specific called party ringback tone or a visual and/or audible indication of the call duration.

10. The method of claim 1 where applying the second set of rules comprises redialing the called party to initiate a new call session.

11. The method of claim 1 where communicating the prompt comprises outputting the prompt visually.

12. The method of claim 11 where communicating the prompt comprises communicating the prompt on a visual display.

13. The method of claim 11 where communicating the prompt comprises communicating the prompt audibly.

14. The method of claim 13 where communicating the prompt comprises communicating the prompt via a phone speaker or computer speaker.

15. The method of claim 11 where communicating the prompt comprises communicating the prompt before the call session is initiated, during at least a portion of the duration of the call session, during the entire call session, or after the call session is terminated.

16. A computer useable medium storing computer readable code, the computer readable code to cause a processor to perform acts comprising:

determining a first set of rules to apply to a call session in a voice over Internet protocol (VoIP) system based on parameters associated with a calling party or a called party, where the called party and the calling party participate in the call session over the VoIP system;

storing the rules in a database;

applying the determined rules to a calling party's incoming VoIP call;

generating a prompt to the calling party, the prompt being based on the first set of rules and the parameters associated with the calling party or a called party, the prompt defining a plurality of call processing features or options; and communicating the prompt to the calling party;

receiving a response to the prompt from the calling party;

receiving the calling party's incoming call over the VoIP system and processing the calling party's incoming call according to the response to the prompt;

determining a second set of rules to apply to the calling party after the call session is terminated, the second set of rules being associated with the terminated call;

storing the second set of rules in the database; and applying the second set of rules after the calling party's call session is terminated, including presenting information to the calling party, where the information is related to the call session duration, billing information related to the call session, or messages recorded during the call session.

17. The computer useable medium of claim 16 further comprising computer readable code to determine parameters comprising a local time where the calling party is located, a local time where the called party is located, the location of the calling party, the location of the called party, a business association related to the calling party or the called party, and personal information related to the calling party or the called party.

18. The computer useable medium of claim 16 further comprising computer readable code to cause a processor to perform acts of:

providing a message to the calling party based on the time of day where the calling party is located or the time of day where the called party is located; and prompting the calling party to continue the call session based on the local time of the calling party or the local time of the called party.

19. The computer useable medium of claim 17 further comprising computer readable code to cause a processor to perform acts of determining a third set of rules to apply to the calling party during the call session, comprising applying the third set of rules to the calling party during the call session.

20. The computer useable medium of claim 16 further comprising computer readable code to cause a processor to perform acts of:

providing a message to the calling party, where the message is related to local conditions of the called party or information associated with the called party; and prompting the calling party to decide a course of action based on the message.

21. The computer useable medium of claim 19 further comprising computer readable code to cause a processor to perform acts of:

applying a general rule to all calling party calls, if the called party sets the general rule;

providing a called party specific alert to the called party, where the called party specific alert is contained in the third set of rules; and providing a calling party specific alert to the calling party, where the calling party specific alert is contained in the third set of rules.

22. The computer useable medium of claim 16 further comprising computer readable code to cause a processor to execute steps of redialing the called party to initiate a new call session.

* * * * *